(12) United States Patent
Nakayama et al.

(10) Patent No.: US 9,034,933 B2
(45) Date of Patent: May 19, 2015

(54) EXPANDED PARTICLE OF POLYETHYLENE-BASED RESIN AND IN-MOLD EXPANSION MOLDED ARTICLE OF POLYETHYLENE-BASED RESIN

(75) Inventors: Kiyotaka Nakayama, Settsu (JP); Toru Yoshida, Settsu (JP)

(73) Assignee: KANEKA CORPORATION, Osaka (JP)

( * ) Notice: Subject to any disclaimer, the term of this patent is extended or adjusted under 35 U.S.C. 154(b) by 541 days.

(21) Appl. No.: 13/521,204

(22) PCT Filed: Jan. 14, 2011

(86) PCT No.: PCT/JP2011/000163
§ 371 (c)(1),
(2), (4) Date: Jul. 9, 2012

(87) PCT Pub. No.: WO2011/086937
PCT Pub. Date: Jul. 21, 2011

(65) Prior Publication Data
US 2012/0283344 A1 Nov. 8, 2012

(30) Foreign Application Priority Data
Jan. 15, 2010 (JP) .................. 2010-007233

(51) Int. Cl.
C08J 9/18 (2006.01)
C08F 110/06 (2006.01)
(Continued)

(52) U.S. Cl.
CPC .............. *C08J 9/18* (2013.01); *Y10T 428/2982* (2015.01); *C08J 9/0023* (2013.01); *C08J 9/0061* (2013.01);
(Continued)

(58) Field of Classification Search
CPC ............. B29C 44/3453; B29C 44/3461; C08J 9/0023; C08J 9/0061; C08J 9/18; C08J 9/228; C08J 2323/04; C08J 2471/02; C08K 5/053; C08K 5/103; C08L 23/0815
See application file for complete search history.

(56) References Cited

U.S. PATENT DOCUMENTS 5,053,435 A 10/1991 Kuwabara et al.
5,459,169 A * 10/1995 Tokoro et al. ............... 521/56
(Continued)

FOREIGN PATENT DOCUMENTS

EP 2 221 337 A1 8/2010
JP 64-1741 A 1/1989
(Continued)

OTHER PUBLICATIONS
Extended European Search Report dated Feb. 28, 2014 issued in European Patent Application No. 11732809.69.
(Continued)

*Primary Examiner* — Irina S Zemel
(74) *Attorney, Agent, or Firm* — Birch, Stewart, Kolasch & Birch, LLP

(57) ABSTRACT

A polyethylene resin expanded particle has an expansion ratio of not less than 10 times and not more than 50 times, and in a DSC curve obtained by differential scanning calorimetry (DSC), the polyethylene resin expanded particle (i) shows two melting peaks, the two melting peaks being a low-temperature side melting peak and a high-temperature side melting peak, and (ii) further has a shoulder in a region not less than 100° C. and not more than the low-temperature side melting peak temperature, the shoulder having a shoulder ratio which is not less than 0.2% and not more than 3%. This makes it possible to obtain a polyethylene resin expanded particle for producing a polyethylene resin in-mold expansion molded article in which especially an end (edge part) of the polyethylene resin in-mold expansion molded article is excellent in fusion bond level and appearance and which has neither a wrinkle nor a void on a surface thereof, is excellent in surface property (has a beautiful surface), and has a high expansion ratio.

14 Claims, 1 Drawing Sheet

(51) Int. Cl.
- C08J 9/00 (2006.01)
- C08J 9/228 (2006.01)
- C08L 23/08 (2006.01)
- B29C 44/34 (2006.01)
- C08K 5/053 (2006.01)
- C08K 5/103 (2006.01)

(52) U.S. Cl.
CPC .............. *C08J 9/228* (2013.01); *C08J 2323/04* (2013.01); *C08J 2471/02* (2013.01); *C08K 5/053* (2013.01); *C08K 5/103* (2013.01); C08L 23/0815 (2013.01); B29C 44/3461 (2013.01); B29C 44/3453 (2013.01)

(56) References Cited

U.S. PATENT DOCUMENTS

| | | | |
|---|---|---|---|
| 5,883,141 A * | 3/1999 | Mihayashi et al. | 521/58 |
| 6,028,121 A | 2/2000 | Takeda et al. | |
| 8,779,019 B2 * | 7/2014 | Nakayama | 521/144 |
| 2002/0143076 A1 | 10/2002 | Kiguchi et al. | |
| 2010/0267850 A1 | 10/2010 | Yoshida et al. | |

FOREIGN PATENT DOCUMENTS

| | | | |
|---|---|---|---|
| JP | 2-75636 A | | 3/1990 |
| JP | 4-372630 A | | 12/1992 |
| JP | 05163381 A | * | 6/1993 |
| JP | 10-204203 A | | 8/1998 |
| JP | 2000-17079 A | | 1/2000 |
| JP | 2002-9725 A | | 4/2002 |
| JP | 2002-226621 A | | 8/2002 |
| WO | WO 97/18260 A1 | | 5/1997 |
| WO | WO 2009/075208 A1 | | 6/2009 |

OTHER PUBLICATIONS

International Preliminary Report on Patentability and Written Opinion issued Aug. 7, 2012, in PCT International Application No. PCT/JP2011/000163.

International Search Report issued Feb. 22, 2011, in PCT International Application No. PCT/JP2011/000163.

* cited by examiner

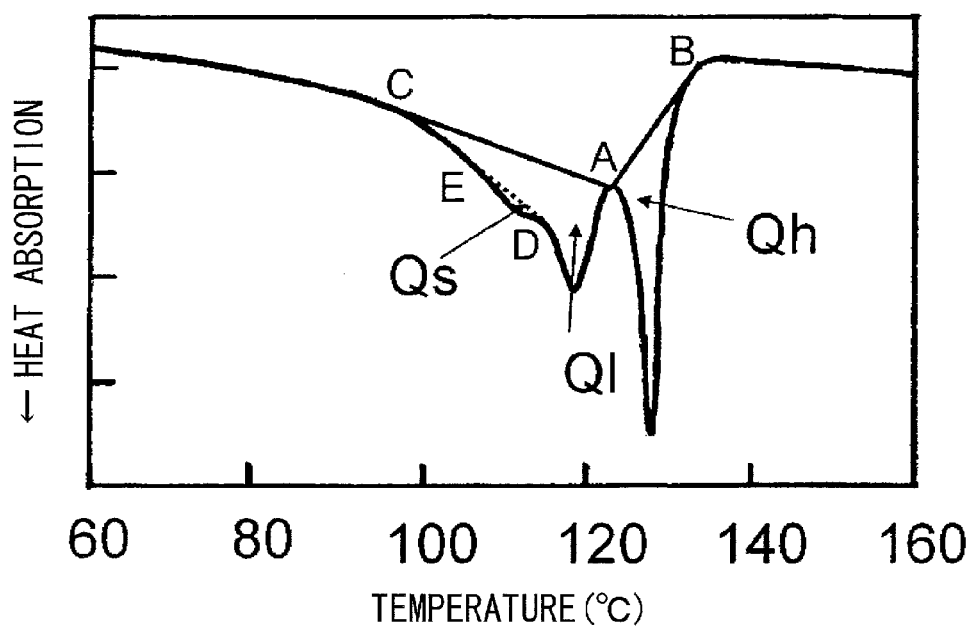

EXPANDED PARTICLE OF POLYETHYLENE-BASED RESIN AND IN-MOLD EXPANSION MOLDED ARTICLE OF POLYETHYLENE-BASED RESIN

TECHNICAL FIELD

The present invention relates to a polyethylene resin expanded particle which is used for, for example, a buffer material, a buffer wrapping material, a returnable case, or a heat insulating material, and to a polyethylene resin in-mold expansion molded article which is obtained by subjecting the polyethylene resin expanded particle to in-mold expansion molding.

BACKGROUND ART

An in-mold expansion molded article obtained by filling a mold with polyethylene resin expanded particles and causing water vapor or the like to heat molding the polyethylene resin expanded particles has characteristics such as an arbitrary property of a shape, a lightweight property, and a heat-insulating property which are advantages of the in-mold expansion molded article.

Various methods for producing polyethylene resin expanded particles are known. Such a method is exemplified by a method (e.g., Patent Literature 1) in which after having been cross-linked, polyethylene resin particles are brought into contact with gaseous carbon dioxide serving as an expanding agent, so as to be impregnated with the carbon dioxide, and thereafter the polyethylene resin particles are water vapor heated, so as to be expanded.

Patent Literatures 2 and 3 disclose polyethylene resin expanded particles obtained as below. Together with carbon dioxide (dry ice), polyethylene resin particles are dispersed into an aqueous dispersion medium. The polyethylene resin particles are heated and pressed, so as to be impregnated with carbon dioxide. Thereafter, the polyethylene resin particles are discharged into a low-pressure region and expanded, so that polyethylene resin expanded particles are obtained. Then, an internal pressure is applied to the polyethylene resin expanded particles thus obtained, and the polyethylene resin expanded particles are steam heated, so as to be further expanded. The following is also disclosed in Patent Literatures 2 and 3. Such a polyethylene resin expanded particle has a cell diameter of not less than 250 µm. In differential scanning calorimetry (DSC), the polyethylene resin expanded particle has two melting peaks that are a low-temperature side melting peak and a high-temperature side melting peak. The high-temperature side melting peak has a heat quantity of 3.5 J/g to 35 J/g.

A method is also known which uses, as an expanding agent, water that is an aqueous dispersion medium mentioned above. In order to cause a polyethylene resin to efficiently absorb water, an ethylene ionomer, as a hydrophilic compound, is mixed with the polyethylene resin (see Patent Literature 4, for example).

Another technique is disclosed in which water or carbon dioxide is used as an expanding agent and polyethylene glycol and/or glycerin is used as a novel hydrophilic compound (see Patent Literature 5, for example).

A method is also known in which, in a case where one-time expansion makes it difficult to obtain expanded particles having a high expansion ratio, expanded particles having a high expansion ratio are obtained by causing expanded particles obtained by one-time expansion to be expanded again.

In differential scanning calorimetry (DSC), polyethylene resin expanded particles disclosed in Patent Literatures 2 through 4 have two melting peaks that are a low-temperature side melting peak and a high-temperature side melting peak.

CITATION LIST

Patent Literatures

Patent Literature 1
Japanese Patent Application Publication, Tokukaihei, No. 4-372630 A (1992)
Patent Literature 2
Japanese Patent Application Publication, Tokukai, No. 2000-17079 A
Patent Literature 3
Japanese Patent Application Publication, Tokukaihei, No. 2-75636 A (1990)
Patent Literature 4
Japanese Patent Application Publication, Tokukaihei, No. 10-204203 A (1998)
Patent Literature 5
International Patent Application Publication No. WO2009/075208

SUMMARY OF INVENTION

Technical Problem

In-mold expansion molding by use of polyethylene resin expanded particles having a high expansion ratio (described earlier) occasionally causes problems such that (i) a wrinkle and/or a void occur(s) on a surface of an in-mold expansion molded article and (ii) an end (edge part) of the in-mold expansion molded article is poor in fusion bond level and appearance. This frequently causes (i) a decrease in commercial value of the in-mold expansion molded article and (ii) a deterioration in productivity of the in-mold expansion molded article.

An object of the present invention is to provide a polyethylene resin expanded particle for producing a polyethylene resin in-mold expansion molded article in which especially an end (edge part) of the polyethylene resin in-mold expansion molded article is excellent in fusion bond level and appearance and which has neither a wrinkle nor a void on a surface thereof, is excellent in surface property (has a beautiful surface), and has a high expansion ratio.

Solution to Problem

As a result of diligent examination, inventors of the present invention have accomplished the present invention by finding that the problems can be solved by carrying out in-mold expansion molding by use of a polyethylene resin expanded particle showing two melting peaks in a DSC curve obtained by differential scanning calorimetry (DSC) of a polyethylene resin expanded particle, the two melting peaks being a low-temperature side melting peak and a high-temperature side melting peak, and further having a shoulder in a region not less than 100° C. and not more than the low-temperature side melting peak temperature.

Namely, the present invention is arranged as below.

[1] A polyethylene resin expanded particle has an expansion ratio of not less than 10 times and not more than 50 times, and in a DSC curve obtained by differential scanning calorimetry (DSC), the polyethylene resin expanded particle (i) shows two melting peaks, the two melting peaks being a low-temperature side melting peak and a high-temperature side melting peak, and (ii) further has a shoulder in a region not less than 100° C. and not more than the low-temperature side melting peak temperature, the shoulder having a heat quantity (Qs) which is not less than 0.2% and not more than 3% of a low-temperature side melting peak heat quantity (Ql).

[2] The polyethylene resin expanded particle mentioned in [1] includes, in not less than 0.05 part by weight and not more than 2 parts by weight with respect to 100 parts by weight of a polyethylene resin, at least one kind selected from glycerin, polyethylene glycol, and glycerin esters of fatty acids having not less than 10 and not more than 25 carbon atoms.

[3] The polyethylene resin expanded particle mentioned in [1] or [2] includes glycerin and/or polyethylene glycol in not less than 0.05 part by weight and not more than 2 parts by weight with respect to 100 parts by weight of the polyethylene resin.

[4] The polyethylene resin expanded particle mentioned in any one of [1] through [3] includes glycerin in not less than 0.05 part by weight and not more than 2 parts by weight with respect to 100 parts by weight of the polyethylene resin.

[5] The polyethylene resin expanded particle mentioned in any one of [1] through [4] is arranged such that the polyethylene resin contains at least a linear low-density polyethylene resin.

[6] The polyethylene resin expanded particle mentioned in any one of [1] through [5] is arranged such that the polyethylene resin contains a linear low-density polyethylene resin in not less than 80 wt % and not more than 99 wt % and a low-density polyethylene resin in not less than 1 wt % and not more than 20 wt % (the polyethylene resin contains the linear low-density polyethylene resin and the low-density polyethylene resin in 100 wt % in total).

[7] The polyethylene resin expanded particle mentioned in any one of [1] through [6] is arranged such that a ratio of a high-temperature side melting peak heat quantity (Qh) to a sum of the low-temperature side melting peak heat quantity (Ql) and the high-temperature side melting peak heat quantity (Qh) (Qh/(Ql+Qh)×100) (%) is not less than 20% and not more than 55%.

[8] The polyethylene resin expanded particle mentioned in any one of [1] through [7] is arranged such that the polyethylene resin expanded particle has an average cell diameter of not less than 150 μm and not more than 400 μm.

[9] The polyethylene resin expanded particle mentioned in any one of [1] through [8] is arranged such that the polyethylene resin expanded particle is obtained through at least two expansion steps.

[10] The polyethylene resin expanded particle mentioned in [9] is arranged such that the at least two expansion steps include a first step of dispersing polyethylene resin particles together with carbon dioxide into an aqueous dispersion medium in a closed vessel, heating the polyethylene resin particles thus dispersed to a temperature not less than a softening temperature of the polyethylene resin particles and pressing the polyethylene resin particles thus heated, and thereafter discharging the polyethylene resin particles into a region having a pressure lower than an internal pressure of the closed vessel.

[11] A polyethylene resin in-mold expansion molded article is obtained by subjecting a polyethylene resin expanded particle mentioned in any one of [1] through [10] to in-mold expansion molding.

[12] A polyethylene resin expanded particle production method includes the step of: impregnating a polyethylene resin particle with carbon dioxide and expanding the polyethylene resin particle, so as to obtain a polyethylene resin expanded particle, and thereafter bringing the polyethylene resin expanded particle thus obtained into contact with water vapor, so as to cause the polyethylene resin expanded particle to have a higher expansion ratio, in a DSC curve obtained by differential scanning calorimetry (DSC), the polyethylene resin expanded particle (i) showing two melting peaks, the two melting peaks being a low-temperature side melting peak and a high-temperature side melting peak, and (ii) further having a shoulder in a region not less than 100° C. and not more than the low-temperature side melting peak temperature, the shoulder having a heat quantity (Qs) which is not less than 0.2% and not more than 3% of a low-temperature side melting peak heat quantity (Ql), and the polyethylene resin expanded particle having an expansion ratio of not less than 10 times and not more than 50 times.

[13] The polyethylene resin expanded particle production method mentioned in [12] is arranged such that the polyethylene resin expanded particle is in contact with water vapor having a pressure (gauge pressure) of not less than 0.045 MPa and not more than 0.15 MPa.

[14] The polyethylene resin expanded particle production method mentioned in [12] or [13] is arranged such that the polyethylene resin expanded particle is brought into contact with water vapor, so as to cause the polyethylene resin expanded particle to have a higher expansion ratio, the polyethylene resin expanded particle having been obtained by dispersing polyethylene resin particles together with carbon dioxide into an aqueous dispersion medium in a closed vessel, heating the polyethylene resin particles thus dispersed to a temperature not less than a softening temperature of the polyethylene resin particles and pressing the polyethylene resin particles thus heated, and thereafter discharging the polyethylene resin particles into a region having a pressure lower than an internal pressure of the closed vessel.

Advantageous Effects of Invention

In a case where a polyethylene resin in-mold expansion molded article having a high expansion ratio is produced by subjecting a polyethylene resin expanded particle of the present invention to in-mold expansion molding, it is possible to obtain a polyethylene resin in-mold expansion molded article in which an end (edge part) of the polyethylene resin in-mold expansion molded article is excellent in fusion bond level and appearance and which has neither a wrinkle nor a void on a surface thereof and is excellent in surface property (has a beautiful surface).

Assume that a polyethylene resin particle contains at least one kind selected from glycerin, polyethylene glycol, and glycerin esters of fatty acids having 10 to 25 carbon atoms. A polyethylene resin expanded particle which is produced by use of carbon dioxide or water serving as an expanding agent that is excellent in environmental suitability makes it easier to obtain an excellent polyethylene resin in-mold expansion molded article as described above.

BRIEF DESCRIPTION OF DRAWINGS

FIG. 1 illustrates an example of a DSC curve obtained by differential scanning calorimetry (DSC) of a polyethylene resin expanded particle of the present invention. The polyethylene resin expanded particle has two melting peaks that are a low-temperature side melting peak and a high-temperature side melting peak, and the polyethylene resin expanded particle further has a shoulder in a region not less than 100° C. and not more than the low-temperature side melting peak temperature.

DESCRIPTION OF EMBODIMENTS

A polyethylene resin expanded particle of the present invention is a polyethylene resin expanded particle having an expansion ratio of not less than 10 times and not more than 50 times, in a DSC curve obtained by differential scanning calorimetry (DSC), the polyethylene resin expanded particle (i) showing two melting peaks, the two melting peaks being a low-temperature side melting peak and a high-temperature side melting peak, and (ii) further having a shoulder in a region not less than 100° C. and not more than the low-temperature side melting peak temperature, the shoulder having a heat quantity (Qs) which is not less than 0.2% and not more than 3% of a low-temperature side melting peak heat quantity (Ql).

Note here that the DSC curve obtained by differential scanning calorimetry of the polyethylene resin expanded particle is obtained by use of a differential scanning calorimeter in a case where not less than 1 mg and not more than 10 mg of polyethylene resin expanded particles are heated from 40° C. to 190° C. at a temperature increase rate of 10° C./min.

The DSC curve of the polyethylene resin expanded particle of the present invention shows two melting peaks that are a low-temperature side melting peak and a high-temperature side melting peak (see FIG. 1). Note here that the high-temperature side melting peak refers to a peak on a high-temperature side in the DSC curve and the low-temperature side melting peak refers to a peak on a lower-temperature side than the high-temperature side melting peak.

Note that the present invention defines the low-temperature side melting peak heat quantity (Ql) and a high-temperature side melting peak heat quantity (Qh) as below. Namely, in a case where a point at which heat is absorbed in the smallest amount between the two melting peaks in the DSC curve that are the low-temperature side melting peak and the high-temperature side melting peak is A, and high-temperature side and low-temperature side points of contact with a tangent line defined by the point A and the DSC curve are B and C, respectively, a part defined by a line segment AB and the DSC curve is the high-temperature side melting peak heat quantity (Qh), and a part defined by a line segment AC and the DSC curve is the low-temperature side melting peak heat quantity (Ql).

It is the most important in the polyethylene resin expanded particle of the present invention that in the DSC curve of the polyethylene resin expanded particle, the polyethylene resin expanded particle further has a shoulder in a region not less than 100° C. and not more than the low-temperature side melting peak temperature.

The DSC curve of the polyethylene resin expanded particle of the present invention has a shoulder in a region not less than 100° C. and not more than the low-temperature side melting peak temperature (see FIG. 1).

Note here that, in a case where an inflection point corresponding to a high-temperature side edge of the shoulder is D and a low-temperature side point of contact with a tangent line defined by the point D and the DSC curve is E, the heat quantity (Qs) of the shoulder refers to a heat quantity of a part defined by a line segment DE and the DSC curve, and is contained in the low-temperature side melting peak heat quantity (Ql).

Note that according to the present invention, it is only necessary that the shoulder in the region not less than 100° C. and not more than the low-temperature side melting peak temperature have an inflection point on the lower-temperature side than the point D and on the higher-temperature side than the point E in the region not less than 100° C. and not more than the low-temperature side melting peak temperature. For example, the point E corresponding to a low-temperature side edge of the shoulder may have a temperature of less than 100° C.

Such a polyethylene resin expanded particle having a shoulder in a DSC curve is likely to be easily obtained by combining the following methods, for example.

(1) A method in which an expansion step is carried out at least two times as below. A polyethylene resin expanded particle having been temporarily obtained is impregnated with an inorganic gas such as air, nitrogen, or carbon dioxide, and an internal pressure is applied thereto. Thereafter, the polyethylene resin expanded particle is brought into contact with water vapor having a given pressure.

(2) A method for expanding a polyethylene resin particle containing at least one kind selected from glycerin, polyethylene glycol, and glycerin esters of fatty acids having not less than 10 and not more than 25 carbon atoms in not less than 0.05 part by weight and not more than 2 parts by weight with respect to 100 parts by weight of a polyethylene resin.

(3) A method which uses, as a raw material, a polyethylene resin particle in which a plurality of polyethylene resins are blended, especially a polyethylene resin particle in which a linear low-density polyethylene resin and a low-density polyethylene resin are blended.

A ratio of the heat quantity (Qs) of the shoulder in the DSC curve of the polyethylene resin expanded particle of the present invention to the low-temperature side melting peak heat quantity (Ql) (the ratio, which is (Qs/Ql)×100(%), hereinafter may be referred to as a "shoulder ratio") is not less than 0.2% and not more than 3%, and preferably not less than 0.2% and not more than 1.6%. The shoulder ratio of less than 0.2% is likely to (i) cause a deterioration in fusion bond level and appearance of an end (edge part) of a polyethylene resin in-mold expansion molded article to be obtained and (ii) cause a deterioration in surface property of the polyethylene resin in-mold expansion molded article. In a case where a polyethylene resin expanded particle having a shoulder ratio of more than 3% is to be obtained, polyethylene resin expanded particles are cohered and blocked, and the polyethylene resin expanded particles may be prevented from being subjected to subsequent in-mold expansion molding. Note here that the end (edge part) of the polyethylene resin in-mold expansion molded article refers to a ridge line part at which surfaces of the polyethylene resin in-mold expansion molded article intersect with each other. Commonly, in a case where this part is insufficiently fusion bonded, a polyethylene resin expanded particle constituting the edge part is easily missing in the part.

It is preferable that the heat quantity (Qs) of the shoulder of the polyethylene resin expanded particle of the present invention be approximately not less than 0.01 J/g and not more than 0.5 J/g. However, this is not generalized since the heat quantity (Qs) depends also on the low-temperature side melting peak heat quantity (Ql). The heat quantity (Qs) of the shoulder which quantity is less than 0.01 J/g is likely to (i) cause a deterioration in fusion bond level and appearance of an end (edge part) of a polyethylene resin in-mold expansion molded article to be obtained and (ii) cause a deterioration in surface property of the polyethylene resin in-mold expansion molded article. In a case where a polyethylene resin expanded particle whose shoulder has a heat quantity (Qs) of more than 0.5 J/g is to be obtained, polyethylene resin expanded particles are cohered and blocked, and the polyethylene resin expanded particles may be prevented from being subjected to subsequent in-mold expansion molding.

Meanwhile, a ratio of the high-temperature side melting peak heat quantity (Qh) (Qh/(Ql+Qh)×100) (hereinafter may be referred to as a DSC ratio), which ratio is not particularly limited, is preferably not less than 20% and not more than 55%. The ratio of less than 20% causes polyethylene resin expanded particles to be expanded at a too high power. This causes only expanded particles in a vicinity of a surface of a mold (top layer part of an in-mold expansion molded article) to be expanded at one time at an initial stage of in-mold expansion molding, so that the expanded particles are fusion bonded. As a result, water vapor to be used for in-mold expansion molding does not permeate into expanded particles inside the mold, so that an in-mold expansion molded article is likely to be obtained in which an inside thereof is insufficiently fusion bonded. In contrast, the ratio of more than 55% causes polyethylene resin expanded particles to be expanded at a too low power, so that it is likely that an in-mold expansion molded article is entirely insufficiently fusion bonded or the in-mold expansion molded article needs to be fusion bonded at a high molding pressure.

The polyethylene resin expanded particle of the present invention has an expansion ratio of not less than 10 times and not more than 50 times. The polyethylene resin expanded particle has an expansion ratio preferably of not less than 12 times and not more than 35 times. The expansion ratio of less than 10 times makes it difficult to obtain a polyethylene resin expanded particle further having shoulder in a region not less than 100° C. and not more than a low-temperature side melting peak temperature in a DSC curve. In contrast, the ratio of more than 50 times is likely to cause a deterioration in mechanical characteristic such as compressive strength of a polyethylene resin in-mold expansion molded article having been subjected to in-mold expansion molding.

Note that according to the present invention, the expansion ratio of the polyethylene resin expanded particle is found as below. A weight w (g) of the polyethylene resin expanded particle is measured. Thereafter, the polyethylene resin expanded particle is immersed in a graduated cylinder containing ethanol, so that a volume v (cm$^3$) of the polyethylene resin expanded particle is measured in accordance with an amount of a rise in water level in the graduated cylinder (an immersion method). Then, a true specific gravity $\rho_b$=w/v of the polyethylene resin expanded particle is found. The expansion ratio is a ratio ($\rho_r/\rho_b$) of a density $\rho_r$ of the polyethylene resin particle which has not been expanded to the true specific gravity $\rho_b$.

An average cell diameter of the polyethylene resin expanded particle of the present invention is not particularly limited. The polyethylene resin expanded particle preferably has an average cell diameter of not less than 150 μm and not more than 400 μm. In a case where the polyethylene resin expanded particle has an average cell diameter of less than 150 μm, a polyethylene resin in-mold expansion molded article obtained by subjecting the polyethylene resin expanded particle to in-mold expansion molding is likely to have a surface whose wrinkles are conspicuous and to deteriorate in surface property. In a case where the polyethylene resin expanded particle has an average cell diameter of more than 400 μm, a polyethylene resin in-mold expansion molded article obtained by subjecting the polyethylene resin expanded particle to in-mold expansion molding deteriorates in buffering property.

Note that according to the present invention, the average cell diameter is measured as below. Randomly selected 10 expanded particles are cut substantially at their respective centers with special care so as not to break their respective cell films. A cut surface of each of the expanded particles is observed by use of a microscope, and a line segment equivalent to a length of 1000 μm is drawn in a part except a top layer part of the each of the expanded particles thus cut. The number n of cells through which the line segment passes is measured, and a cell diameter is found based on 1000/n (μm). An average of cell diameters of the respective expanded particles is referred to as the average cell diameter.

A polyethylene resin to be used in the present invention is exemplified by a high-density polyethylene resin, a medium-density polyethylene resin, a low-density polyethylene resin, and a linear low-density polyethylene resin. Of these polyethylene resins, a linear low-density polyethylene resin is preferably used from the viewpoint of obtainment of a highly expanded polyethylene resin in-mold expansion molded article. Alternatively, it is possible to use a blend of a plurality of linear low-density polyethylene resins which differ in density. Further, it is also possible to use a blend of a linear low-density polyethylene resin and at least one kind selected from a high-density polyethylene resin, a medium-density polyethylene resin, and a low-density polyethylene resin.

Use of a blend of a plurality of polyethylene resins widens a pressure range in which in-mold expansion molding can be carried out, and makes it easy to obtain a shoulder when a polyethylene resin expanded particle is made. In view of this, use of a blend of a plurality of polyethylene resins is a preferable embodiment of the present invention. In particular, a blend of a linear low-density polyethylene resin and a low-density polyethylene resin is more preferable.

From the viewpoint of easiness of obtainment of a shoulder and an expanding property obtained when a polyethylene resin expanded particle is made, in a case where a linear low-density polyethylene resin and a low-density polyethylene resin are blended in 100 wt % in total, it is preferable that the linear low-density polyethylene resin be contained in not less than 80 wt % and not more than 99 wt % and the low-density polyethylene resin be contained in not less than 1 wt % and not more than 20 wt %. It is more preferable that the linear low-density polyethylene resin be contained in not less than 90 wt % and not more than 98 wt % and the low-density polyethylene resin be contained in not less than 2 wt % and not more than 10 wt %. Note that the low-density polyethylene resin of the present invention refers to so-called high-pressure process polyethylene having many branches, and is discriminated from a linear low-density polyethylene resin having few branches.

For example, it is possible to use, as the linear low-density polyethylene resin, a linear low-density polyethylene resin having a melting point of not less than 115° C. and not more than 130° C., a density of not less than 0.915 g/cm$^3$ and not more than 0.940 g/cm$^3$, and a melt index of not less than 0.1 g/10 min and not more than 5 g/10 min. Note that the melt index, which is in conformity with JIS K7210, is measured at a temperature of 190° C. and under a load of 2.16 kg.

The linear low-density polyethylene resin may contain a comonomer which is other than ethylene and copolymerizes with ethylene. As the comonomer which copolymerizes with ethylene, α-olefin having not less than 4 and not more than 18 carbon atoms can be used, and is exemplified by 1-butene, 1-pentene, 1-hexene, 3,3-dimethyl-1-butene, 4-methyl-1-pentene, 4,4-dimethyl-1-pentene, 1-octene, and the like. These comonomers can be used alone or in combination of two or more kinds. In order to cause a copolymer to have a density which falls within the foregoing range, it is preferable that a comonomer copolymerize with ethylene in approximately not less than 3 wt % and not more than 12 wt %.

For example, it is possible to use, as the low-density polyethylene resin, a low-density polyethylene resin having a melting point of not less than 100° C. and not more than 120° C., a density of not less than 0.910 g/cm³ and not more than 0.930 g/cm³, and a melt index of not less than 0.1 g/10 min and not more than 100 g/10 min. Note that the melt index, which is in conformity with JIS K7210, is measured at a temperature of 190° C. and under a load of 2.16 kg.

The low-density polyethylene resin may contain a comonomer which is other than ethylene and copolymerizes with ethylene. As the comonomer which copolymerizes with ethylene, α-olefin having not less than 4 and not more than 18 carbon atoms can be used, and is exemplified by 1-butene, 1-pentene, 1-hexene, 3,3-dimethyl-1-butene, 4-methyl-1-pentene, 4,4-dimethyl-1-pentene, 1-octene, and the like. These comonomers can be used alone or in combination of two or more kinds.

According to the present invention, it is preferable to cause a polyethylene resin particle to contain, as a hydrophilic compound, at least one kind selected from glycerin, polyethylene glycol, and glycerin esters of fatty acids having not less than 10 and not more than 25 carbon atoms.

Note that polyethylene glycol is a nonionic water-soluble polymer having a structure in which ethylene glycol is polymerized, and has a molecular weight of approximately not more than 50,000. Polyethylene glycol to be used in the present invention has an average molecular weight preferably of not less than 200 and not more than 9000, and more preferably of not less than 200 and not more than 600. Of the glycerin esters of fatty acids having not less than 10 and not more than 25 carbon atoms, a monoester, a diester, or a triester obtained by reacting stearic acid with glycerin is preferable. A mixture of these esters may also be used.

The polyethylene resin particle which contains at least one kind selected from glycerin, polyethylene glycol, and glycerin esters of fatty acids having not less than 10 and not more than 25 carbon atoms allows easy obtainment of a polyethylene resin expanded particle having a high expansion ratio. Of these compounds, from the viewpoint that (i) it is easy to obtain a polyethylene resin expanded particle which contains such a compound in a low amount and has a high expansion ratio and (ii) an end (edge part) of an in-mold expansion molded article obtained by subjecting the polyethylene resin expanded particle to in-mold expansion molding is excellent in fusion bond level and appearance, a glycerin and/or polyethylene glycol is more preferable, and glycerin is the most preferable.

The polyethylene resin particle contains at least one kind selected from the group consisting of glycerin, polyethylene glycol, and glycerin esters of fatty acids having not less than 10 and not more than 25 carbon atoms, preferably in not less than 0.05 part by weight and not more than 2 parts by weight, and more preferably in not less than 0.05 part by weight and not more than 0.5 part by weight, with respect to 100 parts by weight of a polyethylene resin. The polyethylene resin particle which contains, in less than 0.05 part by weight, at least one kind selected from glycerin, polyethylene glycol, and glycerin esters of fatty acids having not less than 10 and not more than 25 carbon atoms is less likely to cause an increase in expansion ratio, and is likely to cause less improvement in level at which an end (edge part) of an in-mold expansion molded article obtained by subjecting the polyethylene resin expanded particle to in-mold expansion molding is fusion bonded. In contrast, the polyethylene resin particle which contains, in more than 2 parts, at least one kind selected from glycerin, polyethylene glycol, and glycerin esters of fatty acids having not less than 10 and not more than 25 carbon atoms by weight is less likely to cause a further increase in expansion ratio.

Note that it is also possible to use another hydrophilic compound in combination provided that the object of the present invention can be attained. Specific examples of the another hydrophilic compound include: aqueous inorganic substances such as sodium chloride, calcium chloride, magnesium chloride, borax, calcium borate, zinc borate, and the like; water-absorbing organic substances such as melamine, isocyanuric acid, and a condensation product of melamine, isocyanuric acid, and the like; and fatty alcohols having not less than 12 and not more than 18 carbon atoms such as cetyl alcohol, stearyl alcohol, and the like. The another hydrophilic compound is further exemplified by 1,2,4-butanetriol, diglycerin, pentaerythritol, trimethylolpropane, sorbitol, D-mannitol, erythritol, hexanetriol, xylitol, D-xylose, inositol, fructose, galactose, glucose, mannose, and the like.

According to the present invention, an expansion nucleating agent which promotes formation of expansion nuclei during expansion can be contained. Examples of the expansion nucleating agent include: inorganic substances such as talc, calcium carbonate, silica, kaolin, barium sulfate, calcium hydroxide, aluminum hydroxide, aluminum oxide, titanium oxide, zeolite, and the like; and fatty acid metallic salts such as calcium stearate, barium stearate, and the like. These expansion nucleating agents may be used alone or in combination of two or more kinds. Of these expansion nucleating agents, talc, calcium carbonate, and calcium stearate are preferable. Further, it is desirable that such a nucleating agent have a sharp particle size distribution.

In what amount the expansion nucleating agent is to be used varies depends on its kind, and cannot be generally determined. The expansion nucleating agent is used in an amount preferably of not less than 0.005 part by weight and not more than 2 parts by weight, and more preferably of not less than 0.01 part by weight and not more than 1 part by weight with respect to 100 parts by weight of the polyethylene resin. Assume that talc is used as the expansion nucleating agent. In this case, the expansion nucleating agent is used in an amount preferably of not less than 0.005 part by weight and not more than 1 part by weight, and more preferably of not less than 0.01 part by weight and not more than 0.5 part by weight, and still more preferably of not less than 0.02 part by weight and not more than 0.2 part by weight, with respect to 100 parts by weight of the polyethylene resin.

The expansion nucleating agent used in an amount of less than 0.005 part by weight may prevent an increase in expansion ratio of a polyethylene resin expanded particle and/or cause a deterioration in uniformity in cells. The expansion nucleating agent used in an amount of more than 2 parts by weight is likely to cause a polyethylene resin expanded particle to have a too small average cell diameter and be poor in in-mold expansion moldability.

Various additives can be appropriately added provided that the object of the present invention can be attained. Examples of the various additives include a compatibilizing agent, an antistatic agent, coloring agents (inorganic pigments such as carbon black, ketjen black, iron black, cadmium yellow, cadmium red, cobalt violet, cobalt blue, iron blue, ultramarine blue, chrome yellow, zinc yellow, barium yellow, and the like, and organic pigments such as a perylene pigment, a polyazo pigment, a quinacridone pigment, a phthalocyanine pigment, a perinone pigment, an anthraquinone pigment, a thioindigo pigment, a dioxazine pigment, an isoindolinone pigment, a quinophthalone pigment, and the like), a stabilizing agent, a weathering agent, a fire retardant, and the like.

In order to produce a polyethylene resin expanded particle of the present invention, a polyethylene resin particle is produced first.

For example, a polyethylene resin particle is produced by use of an extruder. Specifically, a hydrophilic compound, an expansion nucleating agent, and other additives are blended with a polyethylene resin in advance according to need. The blend is poured into the extruder and melt-kneaded, and extruded from a die and cooled. Thereafter, the blend can have a shape of particle by being chopped with a cutter. Alternatively, in a case where a liquid hydrophilic compound is used, the liquid hydrophilic compound may be added to a molten polyethylene resin and kneaded in the middle of the melt-kneading in the extruder. Alternatively, a liquid hydrophilic compound may be supplied in a fixed quantity in a hopper part via which a polyethylene resin is poured into the extruder. In this case, in order to reduce transpiration, it is desirable that a cylinder and a die part of the extruder have a relatively low temperature of not more than 250° C., and more preferably of not more than 220° C.

The polyethylene resin expanded particle of the present invention can be produced by use of the polyethylene resin particle thus obtained.

A preferable embodiment of a method for producing a polyethylene resin expanded particle is exemplified by the following method for producing a polyethylene resin expanded particle by use of a water dispersion system. The polyethylene resin expanded particle is obtained through an expansion step of dispersing polyethylene resin particles together with an expanding agent into an aqueous dispersion medium in a closed vessel, heating the polyethylene resin particles thus dispersed to a temperature not less than a softening temperature of the polyethylene resin particles and pressing the polyethylene resin particles, and thereafter discharging the polyethylene resin particles impregnated with the expanding agent into a region having a pressure (normally an atmospheric pressure) lower than an internal pressure of the closed vessel.

Specifically, after polyethylene resin particles, an aqueous dispersion medium, and, according to need, a dispersing agent and the like are placed in a closed vessel, the closed vessel is vacuumed according to need. Thereafter, an expanding agent is poured until the closed vessel has an internal pressure (gauge pressure) of not less than 1 MPa and not more than 2 MPa, and then the polyethylene resin particles are heated to a temperature not less than a softening temperature of a polyethylene resin. The heating increases the internal pressure (gauge pressure) of the closed vessel to approximately not less than 1.5 MPa and not more than 5 MPa. According to need, the expanding agent is further added in a vicinity of an expansion temperature, so as to adjust the internal pressure to a desired expansion pressure. Further, the polyethylene resin particles are held for more than 0 (zero) minute and not more than 120 minutes while the temperature is being finely adjusted to the expansion temperature. Subsequently, the polyethylene resin particles are discharged into a region having a pressure (normally an atmospheric pressure) lower than the internal pressure of the closed vessel, so that a polyethylene resin expanded particle is obtained.

An expanding agent may be poured in, for example, the following method other than the above method. After polyethylene resin particles, an aqueous dispersion medium, and, according to need, a dispersing agent and the like are placed in a closed vessel, the closed vessel is vacuumed according to need. Thereafter, an expanding agent may be poured while the polyethylene resin particles are being heated to a temperature not less than a softening temperature of a polyethylene resin. Alternatively, an expanding agent may be poured after polyethylene resin particles, an aqueous dispersion medium, and, according to need, a dispersing agent and the like are placed in a closed vessel and then heated to a temperature in a vicinity of an expansion temperature.

Note that an expansion ratio and an average cell diameter may be adjusted as below. For example, an internal pressure of a closed vessel is increased by injecting carbon dioxide, nitrogen, air, or a substance used as an expanding agent before discharging polyethylene resin particles into a low-pressure region, so that a pressure release speed during expansion is adjusted. Further, the internal pressure is controlled by pouring carbon dioxide, nitrogen, air, or the substance used as the expanding agent into the closed vessel while the polyethylene resin particles are being discharged into the low-pressure region. The expansion ratio and the average cell diameter are thus adjusted.

As described earlier, in a DSC curve obtained by differential scanning calorimetry (DSC), the polyethylene resin expanded particle of the present invention shows two melting peaks, the two melting peaks being a low-temperature side melting peak and a high-temperature side melting peak. The method for producing a polyethylene resin expanded particle by use of a water dispersion system (described earlier) allows the polyethylene resin expanded particle having such two melting peaks to be easily obtained in a case where (i) an in-vessel temperature (approximately an expansion temperature) of the closed vessel is set to an appropriate value before polyethylene resin particles are discharged into a low-pressure region and (ii) the polyethylene resin particles are held for an appropriate time at a temperature in a vicinity of the in-vessel temperature. It is only necessary that the in-vessel temperature be selected from the following temperatures: not less than −10° C. from a melting point of a polyethylene resin serving as a base material, preferably not less than −5° C. from the melting point, less than a melting end temperature, and preferably not more than −2° C. from the melting end temperature. A time for which the polyethylene resin particles are held at the in-vessel temperature (hereinafter may also be referred to as a hold time) is more than 0 minute and not more than 120 minutes, preferably not less than 2 minutes and not more than 60 minutes, and more preferably not less than 10 minutes and not more than 40 minutes.

Note here that the melting point of the polyethylene resin refers to a temperature of a melting peak at a second temperature increase in a DSC curve obtained in a case where by use of a differential scanning calorimeter, not less than 1 mg and not more than 10 mg of the polyethylene resin is increased in temperature from 40° C. to 190° C. at a rate of 10° C./min and then cooled to 40° C. at a rate of 10° C./min, and the polyethylene resin is increased in temperature again to 190° C. at a rate of 10° C./min. Note also that the melting end temperature refers to a temperature obtained when an edge of the melting peak at the second temperature increase returns to a base line on the high-temperature side.

Note that a DSC ratio (described earlier) can be adjusted by appropriately adjusting an in-vessel temperature and/or a hold time.

A closed vessel into which polyethylene resin particles are dispersed is not particularly limited provided that the closed vessel is resistant to an in-vessel pressure and in-vessel temperature during production of an expanded particle. The closed vessel is exemplified by an autoclave pressure-resistant vessel.

An expanding agent to be used in the present invention is exemplified by saturated hydrocarbons such as propane, butane, and pentane, ethers such as dimethylether and the like, alcohols such as methanol, ethanol, and the like and inorganic gases such as air, nitrogen, carbon dioxide, water, and the like. In particular, it is desirable to use carbon dioxide or water of these expanding agents from the viewpoint of less environmental load and no risk of combustion.

It is preferable that only water be used as the aqueous dispersion medium. Alternatively, a dispersion medium obtained by adding methanol, ethanol, ethylene glycol, glycerin, or the like to water can also be used as the aqueous dispersion medium. In particular, in a case where the present invention is arranged such that a polyethylene resin particle contains a hydrophilic compound, water contained in the aqueous dispersion medium also functions as an expanding agent. This contributes to an increase in expansion ratio.

In order to prevent cohesion among polyethylene resin particles in the aqueous dispersion medium, it is preferable to use a dispersing agent. The dispersing agent can be exemplified by inorganic dispersing agents such as calcium tertiary phosphate, magnesium tertiary phosphate, basic magnesium carbonate, calcium carbonate, barium sulfate, kaolin, talc, clay, and the like.

It is preferable to use an auxiliary dispersing agent together with the dispersing agent. The auxiliary dispersing agent is exemplified by anionic surfactants such as carboxylates such as N-acylamino acid salt, alkyl ether carboxylate, acylated peptide, and the like; sulfonates such as alkyl sulfonate, n-paraffin sulfonate, alkylbenzene sulfonate, alkyl naphthalene sulfonate, sulfosuccinate, and the like; sulfate esters such as sulfated oil, alkyl sulfate, alkyl ether sulfate, alkylamide sulfate, and the like; phosphate esters such as alkyl phosphate, polyoxyethylene phosphate, alkylarylether sulfate, and the like; and the like. The auxiliary dispersing agent is also exemplified by polycarboxylic polymer surfactants such as maleic acid copolymer salt, polyacrylate, and the like, and multi-charged anionic polymer surfactants such as polystyrene sulfonate, naphthalic sulfonate formalin condensate salt, and the like.

Of these dispersing agents and auxiliary dispersing agents, it is preferable to use, as the dispersing agent, at least one kind selected from calcium tertiary phosphate, magnesium tertiary phosphate, barium sulfate, and kaolin, and to use n-paraffin sulfonic acid soda as the auxiliary dispersing agent in combination with the dispersing agent.

In what amount the dispersing agent and the auxiliary dispersing agent are to be used varies depends on their respective kinds and a kind and a used amount of polyethylene resin to be used. It is normally preferable that with respect to 100 parts by weight of the aqueous dispersion medium, the dispersing agent be blended in not less than 0.1 part by weight and not more than 3 parts by weight and the auxiliary dispersing agent be blended in not less than 0.001 part by weight and not more than 0.1 part by weight. Meanwhile, it is normally preferable that polyethylene resin particles be used in not less than 20 parts by weight and not more than 100 parts by weight with respect to 100 parts by weight of the aqueous dispersion medium so that the polyethylene resin particles can be favorably dispersed in the aqueous dispersion medium.

In addition to the method for producing a polyethylene resin expanded particle by use of a water dispersion system (described earlier), another method also allows obtainment of a polyethylene resin expanded particle. According to the another method, the polyethylene resin particle is impregnated with an expanding agent without using the aqueous dispersion medium, e.g., by bringing the expanding agent into direct contact with a polyethylene resin particle, so that an expandable polyethylene resin particle is obtained. Then, the expandable polyethylene resin particle is expanded by, for example, being brought into contact with water vapor. A polyethylene resin expanded particle is thus obtained.

As described earlier, an expansion step at a first stage of obtaining a polyethylene resin expanded particle from a polyethylene resin particle may be referred to as a first stage expansion step, and the polyethylene resin expanded particle thus obtained may be referred to as a "first stage expanded particle". Depending on a kind of an expanding agent to be used during production, the first stage expanded particle may have an expansion ratio which falls below 10 times. Further, a shoulder in a region not less than $100°$ C. and not more than a low-temperature side melting peak temperature (hereinafter may be simply referred to as a shoulder) may be prevented from appearing in a DSC curve of the first stage expanded particle. In such a case, if an internal pressure is applied to the first stage expanded particle which is impregnated with an inorganic gas such as air, nitrogen, or carbon dioxide, and thereafter the first stage expanded particle is brought into contact with water vapor having a specific pressure, it is possible to obtain a polyethylene resin expanded particle of the present invention which (i) has a higher expansion ratio than the first stage expanded particle and (ii) has a shoulder in the DSC curve. As described above, a step of further expanding the polyethylene resin expanded particle, so as to cause the polyethylene resin expanded particle to have a higher expansion ratio may be referred to as a second stage expansion step. The second stage expansion step allows an increase in expansion ratio and obtainment of an expanded particle which has a shoulder appearing in the DSC curve. The polyethylene resin expanded particle thus obtained through the second stage expansion step may be referred to as a "second stage expanded particle".

Specifically, the second stage expansion step is a step of applying an internal pressure to a first stage expanded particle which is impregnated with an inorganic gas such as air, nitrogen, or carbon dioxide, and thereafter bringing the first stage expanded particle into contact with water vapor having a specific pressure, thereby obtaining a second stage expanded particle which has a higher expansion ratio than the first stage expanded particle.

Note here that a pressure of water vapor used in the second expansion step is extremely important for obtainment of a second stage expanded particle having a shoulder. In consideration of an expansion ratio of a second stage expanded particle, the pressure (gauge pressure) is adjusted preferably to not less than 0.045 MPa and not more than 0.15 MPa, and more preferably to 0.05 MPa and not more than 0.1 MPa. The pressure (gauge pressure) less than 0.045 MPa may prevent appearance of a shoulder, whereas the pressure (gauge pressure) more than 0.15 MPa allows appearance of the shoulder but is likely to cause cohesion and blocking of second stage expanded particles to be obtained and to prevent the second stage expanded particles from being subjected to subsequent in-mold expansion molding.

It is desirable that an internal pressure of an inorganic gas with which a first stage expanded particle is impregnated be appropriately changed in consideration of a pressure of water vapor used in the second expansion step, the pressure affecting presence/absence of a shoulder and/or a shoulder ratio. It is preferable that the internal pressure (absolute pressure) be not less than 0.2 MPa and not more than 0.6 MPa. The internal pressure (absolute pressure) of less than 0.2 MPa requires high-pressure water vapor for causing an increase in expansion ratio, so that second stage expanded particles are likely to be blocked. The internal pressure (absolute pressure) of more than 0.6 MPa causes a reduction in pressure of water vapor for obtaining a desired expansion ratio, so that a second stage expanded particle having no shoulder is likely to be obtained.

As described earlier, since a polyethylene resin expanded particle to be obtained through at least two expansion steps which are the first stage expansion step and the second stage expansion step is likely to have a shoulder, the polyethylene resin expanded particle is a preferable embodiment of the present invention. Note that in accordance with an expansion ratio and whether or not a shoulder appears, a polyethylene resin expanded particle of the present invention may be obtained by repeatedly carrying out an expansion step identical to the second stage expansion step, i.e., through a third stage expansion step.

The first stage expansion step and the second stage expansion step which are described above have been conventionally well known. However, no prior art is disclosed that focuses on a technique for adjusting (i) an internal pressure of an inorganic gas with which a first stage expanded particle is impregnated during second expansion and (ii) a pressure of water vapor used during the second stage expansion step, so as to obtain an expanded particle having a shoulder appearing in a DSC curve of a polyethylene resin expanded particle. It is not known that an end (edge part) of a polyethylene resin in-mold expansion molded article to be obtained from a polyethylene resin expanded particle of the present invention having a shoulder ratio is excellent in fusion bond level and appearance.

In particular, of polyethylene resin expanded particles of the present invention each having a shoulder in a DSC curve, each of (i) the polyethylene resin expanded particle containing at least one kind selected from glycerin, polyethylene glycol, and glycerin esters of fatty acids having not less than 10 and not more than 25 carbon atoms and (ii) the polyethylene resin expanded particle in which a linear low-density polyethylene and a low-density polyethylene are used in combination as a polyethylene resin allows an end (edge part) of a polyethylene resin in-mold expansion molded article to be further excellent in fusion bond level and appearance. This was first found by the present invention.

An in-mold expansion molded article can be made by subjecting a polyethylene resin expanded particle thus obtained to conventionally known in-mold expansion molding. For example, it is possible to use the following methods: a) a method for causing an inorganic gas such as air, nitrogen, or carbon dioxide to subject a polyethylene resin expanded particle to a pressure treatment, so as to impregnate the polyethylene resin expanded particle with the inorganic gas, applying a given internal pressure to the polyethylene resin expanded particle, and thereafter filling a mold with the polyethylene resin expanded particle, so as to cause water vapor to subject the polyethylene resin expanded particle to heat fusion bonding; b) a method for causing a gas pressure to compress a polyethylene resin expanded particle and filling a mold with the polyethylene resin expanded particle, and causing water vapor to subject the polyethylene resin expanded particle to heat fusion bonding by use of resilience of the polyethylene resin expanded particle; and c) a method for filling a mold with a polyethylene resin expanded particle without subjecting the polyethylene resin expanded particle to a particular pretreatment, and causing water vapor to subject the polyethylene resin expanded particle to heat fusion bonding.

EXAMPLES

The following description more specifically discusses the present invention with reference to Examples and Comparative Examples. However, the present invention is not limited to such Examples and Comparative Examples.

Note that evaluations were carried out in the Examples and Comparative Examples in accordance with the following method.

(DSC Measurement of Polyethylene Resin Expanded Particle) A differential scanning calorimeter (DSC) [DSC6200, produced by Seiko Instruments Inc.] was used to find melting peak temperatures or melting heat quantities of respective polyethylene resin expanded particles based on a DSC curve at a first temperature increase, the DSC curve being obtained when 3 mg to 6 mg of the polyethylene resin expanded particles were increased in temperature from 40° C. to 190° C. at a rate of temperature increase of 10° C./min.

(Expansion Ratio)

Approximately not less than 3 g and not more than 10 g of expanded particles were taken and dried at 60° C. for 6 hours. Thereafter, conditioning was carried out in a room at a temperature of 23° C. and a humidity of 50%, and a weight w (g) of the expanded particles was measured. Then, the expanded particles were immersed in a graduated cylinder, so that a volume v ($cm^3$) of the expanded particles was measured in accordance with an amount of a rise in water level in the graduated cylinder (an immersion method). Then, a true specific gravity $\rho b=w/v$ of the expanded particles was found, and an expansion ratio $K=\rho r/\rho b$ was found based on a ratio of a density $\rho r$ of polyethylene resin particles which had not been expanded to the true specific gravity $\rho b$. Note that in the following Examples and Comparative Examples, each of the polyethylene resin particles which had not been expanded had a density $\rho r$ of 0.93 $g/cm^3$.

(Average Cell Diameter)

Ten expanded particles of obtained pre-expanded particles were randomly selected and cut substantially at their respective centers with special care so as not to break their respective cell films. A cut surface of each of the expanded particles was observed by use of a microscope, and a line segment equivalent to a length of 1000 μm was drawn in a part except a top layer part of the each of the expanded particles thus cut. The number n of cells through which the line segment passes was measured, and a cell diameter was found based on 1000/n (μm). The finding was similarly carried out with respect to the ten expanded particles. An average of cell diameters thus found of the respective expanded particles was referred to as an average cell diameter.

(Fusion Bonding Property of Molded Article)

A mold was used which had an in-mold expansion molded article design dimension of 400 mm×300 mm×50 mm. Polyethylene resin expanded particles were subjected to in-mold expansion molding at a molding pressure (gauge pressure) ranging from 0.08 MPa to 0.14 MPa at intervals of 0.01 MPa. Thereafter, a polyethylene resin in-mold expansion molded article obtained by the in-mold expansion molding was left standing at 23° C. for 2 hours. Subsequently, the polyethylene resin in-mold expansion molded article was matured at 65° C. for 24 hours. Then, the polyethylene resin in-mold expansion molded article was left in a room at a temperature of 23° C. for 4 hours, so that an in-mold expansion molded article to be evaluated was obtained. A crack having a depth of approximately 5 mm was made on a surface of the in-mold expansion molded article by use of a knife. Thereafter, the in-mold expansion molded article was fractured along the clack, and a fracture surface was observed. Then, a ratio of the number of broken particles to the total number of particles on the fracture surface was found, and the ratio was referred to as a molded article fusion bonding ratio. A minimum molding pressure which allows the molded article fusion bonding ratio to reach not less than 70% was regarded as an indicator of fusion bonding property.

(Surface Property of Molded Article)

A surface of an in-mold expansion molded article obtained by in-mold expansion molding at a molding pressure (gauge pressure) of 0.11 MPa was evaluated by the following criteria.

G (Good): The surface, which has few wrinkles and intergranular gaps, and no conspicuous surface unevenness, is beautiful.

F (Fair): The surface has wrinkles and intergranular gaps, and slightly conspicuous surface unevenness.

P (Poor): The surface, which has not only wrinkles and intergranular gaps but also molding sinks, is clearly poor in appearance.

(Fusion Bonding and Appearance of Edge Part (End) of Molded Article)

An edge (end) of an in-mold expansion molded article obtained by molding at a molding pressure (gauge pressure) of 0.11 MPa was evaluated by the following criteria.

G (Good): Adjacent expanded particles are completely fusion bonded in any part with no gap therebetween.

F (Fair): Adjacent expanded particles are not fusion bonded in some parts.

P (Poor): Adjacent expanded particles are not fusion bonded in many parts.

(Dimensional Contraction Ratio of Molded Article)

A longitudinal dimension (in a 400 mm direction) of the in-mold expansion molded article obtained by molding at a molding pressure (gauge pressure) of 0.11 MPa was measured, and a contraction ratio to mold dimension was evaluated by the following criteria, the contraction ratio to mold dimension being a ratio of a difference between a corresponding mold dimension and a dimension of the in-mold expansion molded article to the corresponding mold dimension. Note that a dimension measurement was carried out by use of Digital Caliper produced by Mitutoyo Corporation.

G (Good): A contraction ratio to mold dimension was not more than 3%.

F (Fair): A contraction ratio to mold dimension was more than 3% and not more than 7%.

P (Poor): A contraction ratio to mold dimension was more than 7%.

Example 1

Preparation of Resin Particle 0.2 part by weight of glycerin (Purified Glycerin D, produced by Lion Corporation) was preblended with respect to 100 parts by weight of a linear low-density polyethylene resin (MI=2.0 g/10 min, melting point: 122° C.). Subsequently, 0.03 part by weight of talc (TALCAN POWDER PK-S, produced by Hayashi-Kasei Co., Ltd.) was added and blended as an expansion nucleating agent. The blended product was supplied to a uniaxis extruder of Φ 50 mm, and melt-kneaded at a resin temperature of 210° C. Thereafter, the resulting product was extruded from a cylindrical die having a diameter of 1.8 mm, water-cooled, and then cut with a cutter, so that columnar linear low-density polyethylene resin particles (1.3 mg/particle) were obtained.

[Preparation of Expanded Resin Particle]

100 parts by weight of the linear low-density polyethylene resin particles thus obtained, together with 200 parts by weight of pure water, 0.5 part by weight of calcium tertiary phosphate, and 0.05 part by weight of n-paraffin sulfonic acid soda, were poured into a pressure-resistant closed vessel and then degassed. While being stirred, the resulting product was heated to 122° C. with 7.5 parts by weight of carbon dioxide poured into the pressure-resistant closed vessel. In this case, an internal pressure (gauge pressure) of the pressure-resistant closed vessel was 3.5 MPa. After the temperature had reached 122° C., the product was held at this temperature for 25 minutes. Subsequently, a bulb provided in a lower part of the closed vessel was opened, and water-dispersed products (resin particles and an aqueous dispersion medium) were discharged, via an orifice, into an expansion pipe at an atmospheric pressure, so that expanded particles (first stage expanded particles) were obtained. In this case, carbon dioxide was additionally injected into the pressure-resistant closed vessel so as not to cause a reduction in internal pressure of the pressure-resistant closed vessel, so that the internal pressure was retained. Meanwhile, the expansion pipe was heated with steam blown thereinto, so that the expanded particles to be discharged and the steam were brought into contact with each other. Each of the first stage expanded particles thus obtained showed two melting points at 117° C. and 128° C., had a DSC ratio of 32%, and had no shoulder. As a result of measurement of an expansion ratio and an average cell diameter, each of the first stage expanded particles had an expansion ratio of 8 times and an average cell diameter of 150 μm. After having been dried at 60° C. for 6 hours, the first stage expanded particles obtained here were impregnated with pressurized air in the pressure-resistant vessel. Then, the internal pressure was set to 0.39 MPa (absolute pressure), and thereafter the first stage expanded particles were subjected to second stage expansion by being brought into contact with water vapor of 0.07 MPa (a gauge pressure). In differential scanning calorimetry, each of second stage expanded particles thus obtained showed two melting points at 118° C. (a low-temperature side melting peak temperature) and 128° C. (a high-temperature side melting peak temperature), had a shoulder in a region not less than 100° C. and not more than the low-temperature side melting peak temperature, had a DSC ratio of 41%, and had a shoulder ratio of 0.5%. As a result of measurement of an expansion ratio and an average cell diameter, each of the second stage expanded particles had an expansion ratio of 27 times and an average cell diameter of 270 μm.

[Preparation of In-Mold Molded Article]

Subsequently, the second stage expanded particles were placed in a mold of 400 mm×300 mm×50 mm, so as to be subjected to in-mold expansion molding. The in-mold expansion molding was carried out at a molding pressure (gauge pressure) ranging from 0.08 MPa to 0.14 MPa at intervals of 0.01 MPa. At any molding pressure, an exhaustion time, a one-side heating time, an opposite one-side heating time, and a both-side heating time were set to 3 seconds, 7 seconds, 7 seconds, and 10 seconds, respectively. For an obtained in-mold expansion molded article, a fusion bonding property, a surface property, an edge part appearance, and a dimensional contraction ratio were evaluated. Table 1 shows a result of the evaluation.

Examples 2 Through 10

Examples 2 through 10 are different from Example 1 only in that kinds of additives and expansion conditions were changed as shown in Table 1. As in the case of Example 1, linear low-density polyethylene resin particles, first stage expanded particles, second stage expanded particles, and an in-mold expansion molded article were obtained, so as to be subjected to the evaluation. Table 1 shows a result of the evaluation. Note that in Example 9, a cylindrical die having a diameter of 3 mm was used to obtain the linear low-density polyethylene resin particles of 4.5 mg/particle.

TABLE 1

|  |  |  | Examples | | | | |
| --- | --- | --- | --- | --- | --- | --- | --- |
|  |  |  | 1 | 2 | 3 | 4 | 5 |
| Linear low-density polyethylene resin |  | pbw | 100 | 100 | 100 | 100 | 100 |
| Low-density polyethylene resin (melting point: 109° C.) |  | pbw |  |  |  |  |  |
| Glycerin |  | pbw | 0.2 | 1 |  |  |  |
| Polyethylene glycol (average molecular weight: 300) |  | pbw |  |  |  | 0.5 | 0.5 |
| Glycerin monoester of stearic acid |  | pbw |  |  |  |  |  |
| Talc |  | pbw | 0.03 | 0.03 | 0.01 | 0.1 | 0.02 |
| Weight of polyethylene resin particle |  | mg/particle | 1.3 | 1.3 | 1.3 | 1.3 | 1.3 |
| First stage expansion condition | Carbon dioxide amount | pbw | 7.5 | 7.5 | 7.5 | 7.5 | 7.5 |
|  | Expansion Temperature | ° C. | 122 | 122 | 122 | 122 | 122 |
|  | Expansion pressure (gauge pressure) | MPa | 3.5 | 3.5 | 3.5 | 3.5 | 3.5 |
| First stage expanded particle | Low-temperature side melting peak temperature | ° C. | 117 | 117 | 117 | 117 | 117 |
|  | High-temperature side melting peak temperature | ° C. | 128 | 128 | 128 | 128 | 128 |
|  | DSC ratio | % | 32 | 32 | 32 | 30 | 30 |
|  | Shoulder ratio | % | 0 | 0 | 0 | 0 | 0 |
|  | Expansion ratio | times | 8 | 12 | 5 | 8 | 8 |
|  | Average cell diameter | μm | 150 | 180 | 130 | 120 | 160 |
| Second stage expansion condition | Expanded particle internal pressure (absolute pressure) | MPa | 0.39 | 0.32 | 0.57 | 0.57 | 0.57 |
|  | Vapor pressure (gauge pressure) | MPa | 0.07 | 0.07 | 0.08 | 0.06 | 0.06 |
| Second stage expanded particle | Low-temperature side melting peak temperature | ° C. | 118 | 118 | 118 | 118 | 118 |
|  | High-temperature side melting peak temperature | ° C. | 128 | 128 | 128 | 128 | 128 |
|  | DSC ratio | % | 41 | 41 | 46 | 40 | 40 |
|  | Shoulder ratio | % | 0.5 | 0.5 | 1.3 | 0.3 | 0.3 |
|  | Expansion ratio | times | 27 | 27 | 27 | 27 | 29 |
|  | Average cell diameter | μm | 270 | 270 | 260 | 230 | 300 |
| In-mold expansion molded article | Minimum molding pressure (fusion bonding property) | MPa | 0.11 | 0.11 | 0.12 | 0.11 | 0.11 |
|  | Surface property | — | G | G | F | F | G |
|  | Fusion bond level and appearance of edge part | — | G | G | F | G | G |
|  | Dimensional contraction ratio | — | G | G | G | G | G |

|  |  |  | Examples | | | | |
| --- | --- | --- | --- | --- | --- | --- | --- |
|  |  |  | 6 | 7 | 8 | 9 | 10 |
| Linear low-density polyethylene resin |  | pbw | 97 | 97 | 100 | 100 | 97 |
| Low-density polyethylene resin (melting point: 109° C.) |  | pbw | 3 | 3 |  |  | 3 |
| Glycerin |  | pbw | 0.2 | 0.2 | 0.2 |  |  |
| Polyethylene glycol (average molecular weight: 300) |  | pbw |  |  |  |  | 0.5 |
| Glycerin monoester of stearic acid |  | pbw |  | 1 | 1 | 0.5 |  |
| Talc |  | pbw | 0.01 | 0.01 | 0.03 | 0.01 | 0.1 |
| Weight of polyethylene resin particle |  | mg/particle | 1.3 | 1.3 | 1.3 | 4.5 | 1.3 |
| First stage expansion condition | Carbon dioxide amount | pbw | 7.5 | 7.5 | 6.0 | 7.5 | 7.5 |
|  | Expansion Temperature | ° C. | 121 | 123 | 124 | 123 | 122 |
|  | Expansion pressure (gauge pressure) | MPa | 3.5 | 3.5 | 2.6 | 3.5 | 3.5 |
| First stage expanded | Low-temperature side melting peak temperature | ° C. | 116 | 116 | 117 | 117 | 117 |

TABLE 1-continued

| particle | High-temperature side melting peak temperature | °C. | 128 | 128 | 128 | 128 | 128 |
|---|---|---|---|---|---|---|---|
| | DSC ratio | % | 33 | 30 | 21 | 36 | 30 |
| | Shoulder ratio | % | 0 | 0 | 0 | 0 | 0 |
| | Expansion ratio | times | 6 | 7 | 8 | 7 | 8 |
| | Average cell diameter | μm | 110 | 170 | 200 | 160 | 130 |
| Second stage expansion condition | Expanded particle internal pressure (absolute pressure) | MPa | 0.57 | 0.40 | 0.39 | 0.52 | 0.57 |
| | Vapor pressure (gauge pressure) | MPa | 0.05 | 0.07 | 0.07 | 0.07 | 0.06 |
| Second stage expanded particle | Low-temperature side melting peak temperature | °C. | 117 | 117 | 118 | 118 | 118 |
| | High-temperature side melting peak temperature | °C. | 128 | 128 | 128 | 128 | 128 |
| | DSC ratio | % | 41 | 41 | 29 | 46 | 40 |
| | Shoulder ratio | % | 0.2 | 0.5 | 0.5 | 0.5 | 0.4 |
| | Expansion ratio | times | 25 | 27 | 24 | 31 | 26 |
| | Average cell diameter | μm | 190 | 300 | 330 | 300 | 240 |
| In-mold expansion molded article | Minimum molding pressure (fusion bonding property) | MPa | 0.11 | 0.11 | 0.09 | 0.11 | 0.11 |
| | Surface property | — | F | G | G | G | G |
| | Fusion bond level and appearance of edge part | — | G | G | G | G | G |
| | Dimensional contraction ratio | — | G | G | G | G | G |

Note:
A shoulder ratio of 0% means that there exists no shoulder in a region not less than 100° C. and not more than a low-temperature side melting peak temperature.

Comparative Examples 1 Through 4

Comparative Examples 1 through 4 are different from Example 1 only in that kinds of additives and expansion conditions were changed as shown in Table 2. As in the case of Example 1, linear low-density polyethylene resin particles, first stage expanded particles, second stage expanded particles, and an in-mold expansion molded article were obtained, so as to be subjected to the evaluation. Note that in Comparative 2, after the second stage expanded particles had been obtained, third stage expanded particles were obtained as in the case of the obtainment of the second stage expanded particles, and the third stage expanded particles were subjected to in-mold expansion molding. Note also that in Comparative Example 3, the first stage expanded particles were subjected to in-mold expansion molding without being subjected to second stage expansion. In Comparative Example 4, when water vapor having a gauge pressure of 0.16 MPa was used in the second stage expansion step, obtained second stage expanded particles, which were cohered and blocked, failed to be subjected to in-mold expansion molding. Table 2 shows a result of the evaluation.

TABLE 2

| | | | Comparative Examples | | | |
|---|---|---|---|---|---|---|
| | | | 1 | 2 | 3 | 4 |
| Linear low-density polyethylene resin | | pbw | 100 | 100 | 100 | 100 |
| Low-density polyethylene resin (melting point: 109° C.) | | pbw | | | | |
| Glycerin | | pbw | 0.2 | 0.2 | 0.2 | 0.2 |
| Polyethylene glycol (average molecular weight: 300) | | pbw | | | | |
| Glycerin monoester of stearic acid | | pbw | | | | |
| Talc | | pbw | 0.03 | 0.03 | 0.03 | 0.03 |
| Weight of polyethylene resin particle | | mg/particle | 1.3 | 1.3 | 1.3 | 1.3 |
| First stage expansion condition | Carbon dioxide amount | pbw | 7.5 | 7.5 | 7.5 | 7.5 |
| | Expansion Temperature | °C. | 122 | 122 | 122 | 122 |
| | Expansion pressure (gauge pressure) | MPa | 3.5 | 3.5 | 3.5 | 3.5 |
| First stage expanded particle | Low-temperature side melting peak temperature | °C. | 117 | 117 | 117 | 117 |
| | High-temperature side melting peak temperature | °C. | 128 | 128 | 128 | 128 |
| | DSC ratio | % | 32 | 32 | 32 | 32 |

TABLE 2-continued

|  |  |  | Comparative Examples | | | |
|---|---|---|---|---|---|---|
|  |  |  | 1 | 2 | 3 | 4 |
|  | Shoulder ratio | % | 0 | 0 | 0 | 0 |
|  | Expansion ratio | times | 8 | 8 | 8 | 8 |
|  | Average cell diameter | μm | 150 | 150 | 150 | 150 |
| Second stage expansion condition | Expanded particle internal pressure (absolute pressure) | MPa | 0.62 | 0.44/ 0.35 (2nd stage/ 3rd stage) |  | 0.39 |
|  | Vapor pressure (gauge pressure) | MPa | 0.03 | 0.03/ 0.03 (2nd stage/ 3rd stage) |  | 0.16 |
| Second stage expanded particle | Low-temperature side melting peak temperature | °C | 117 | 118 (3rd stage) |  | 117 |
|  | High-temperature side melting peak temperature | °C | 128 | 128 (3rd stage) |  | 128 |
|  | DSC ratio | % | 41 | 41 (3rd stage) |  | 39 |
|  | Shoulder ratio | % | 0 | 0 (3rd stage) |  | 3.2 |
|  | Expansion ratio | times | 23 | 24 (3rd stage) |  | Not measured |
|  | Average cell diameter | μm | 240 | 240 (3rd stage) |  | Not measured |
| In-mold expansion molded article | Minimum molding pressure (fusion bonding property) | MPa | 0.11 | 0.11 (3rd stage) | 0.11 | Second stage expanded particles were cohered and blocked, and failed to be subjected to in-mold expansion molding. |
|  | Surface property | — | F | G (3rd stage) | F | |
|  | Fusion bond level and appearance of edge part | — | P | P (3rd stage) | P | |
|  | Dimensional contraction ratio | — | F | F (3rd stage) | F | |

Note:
A shoulder ratio of 0% means that there exists no shoulder in a region not less than 100° C. and not more than a low-temperature side melting peak temperature.

A comparison between the Examples and the Comparative Examples shows that an edge part of an in-mold expansion molded article is excellent in fusion bond level and appearance in a case where a polyethylene resin expanded particle to be subjected to an in-mold expanded particle has a shoulder whose shoulder ratio is not less than 0.2% and not more than 3%.

A comparison between Example 3 and the other Examples shows that an edge part of an in-mold expansion molded article is further excellent in fusion bond level and appearance in a case where a polyethylene resin expanded particle to be subjected to an in-mold expanded particle has a shoulder and contains at least one kind selected from glycerin, polyethylene glycol, and glycerin esters of fatty acids having not less than 10 and not more than 25 carbon atoms. A comparison among Example 1, Comparative Example 1, Comparative Example 3, and Comparative Example 4 shows that second stage expansion is one of the effective methods for causing a shoulder to appear. However, it is revealed that even addition of glycerin prevents appearance of a shoulder in a case where water vapor has a too low pressure in the second expansion, and consequently an edge part of an in-mold expansion molded article is poor in fusion bond level and appearance. On the contrary, it is also revealed that, in a case where water vapor has a too high pressure in the second expansion, second expanded particles are cohered and blocked, and fail to be subjected to in-mold expansion molding.

The invention claimed is:

1. A polyethylene resin expanded particle having an expansion ratio of not less than 10 times and not more than 50 times, and in a DSC curve obtained by differential scanning calorimetry (DSC), the polyethylene resin expanded particle (i) showing two melting peaks, the two melting peaks being a low-temperature side melting peak and a high-temperature side melting peak, and (ii) further having a shoulder in a region not less than 100° C. and not more than the low-temperature side melting peak temperature, the shoulder having a heat quantity ($Q_s$) which is not less than 0.2% and not more than 3% of a low-temperature side melting peak heat quantity (Ql).

2. The polyethylene resin expanded particle as set forth in claim 1, comprising, in not less than 0.05 part by weight and not more than 2 parts by weight with respect to 100 parts by weight of a polyethylene resin, at least one kind selected from glycerin, polyethylene glycol, and glycerin esters of fatty acids having not less than 10 and not more than 25 carbon atoms.

3. The polyethylene resin expanded particle as set forth in claim 1, comprising glycerin and/or polyethylene glycol in not less than 0.05 part by weight and not more than 2 parts by weight with respect to 100 parts by weight of the polyethylene resin.

4. The polyethylene resin expanded particle as set forth in claim 1, comprising glycerin in not less than 0.05 part by weight and not more than 2 parts by weight with respect to 100 parts by weight of the polyethylene resin.

5. The polyethylene resin expanded particle as set forth in claim 1, wherein the polyethylene resin contains at least a linear low-density polyethylene resin.

6. The polyethylene resin expanded particle as set forth in claim 1, wherein the polyethylene resin contains a linear low-density polyethylene resin in not less than 80 wt % and not more than 99 wt % and a low-density polyethylene resin in not less than 1 wt % and not more than 20 wt % (the polyethylene resin contains the linear low-density polyethylene resin and the low-density polyethylene resin in 100 wt % in total).

7. The polyethylene resin expanded particle as set forth in claim 1, wherein a ratio of a high-temperature side melting peak heat quantity (Qh) to a sum of the low-temperature side melting peak heat quantity (Ql) and the high-temperature side melting peak heat quantity (Qh)(Qh/(Ql+Qh)×100) (%) is not less than 20% and not more than 55%.

8. The polyethylene resin expanded particle as set forth in claim 1, wherein the polyethylene resin expanded particle has an average cell diameter of not less than 150 μm and not more than 400 μm.

9. The polyethylene resin expanded particle as set forth in claim 1, wherein the polyethylene resin expanded particle is obtained through at least two expansion steps.

10. The polyethylene resin expanded particle as set forth in claim 9, wherein the at least two expansion steps include a first step of dispersing polyethylene resin particles together with carbon dioxide into an aqueous dispersion medium in a closed vessel, heating the polyethylene resin particles thus dispersed to a temperature not less than a softening temperature of the polyethylene resin particles and pressing the polyethylene resin particles thus heated, and thereafter discharging the polyethylene resin particles into a region having a pressure lower than an internal pressure of the closed vessel.

11. A polyethylene resin in-mold expansion molded article obtained by subjecting a polyethylene resin expanded particle recited in claim 1 to in-mold expansion molding.

12. A polyethylene resin expanded particle production method comprising the step of
impregnating a polyethylene resin particle with carbon dioxide and expanding the polyethylene resin particle, so as to obtain a polyethylene resin expanded particle, and thereafter bringing the polyethylene resin expanded particle thus obtained into contact with water vapor, so as to cause the polyethylene resin expanded particle to have a higher expansion ratio,
in a DSC curve obtained by differential scanning calorimetry (DSC), the polyethylene resin expanded particle (i) showing two melting peaks, the two melting peaks being a low-temperature side melting peak and a high-temperature side melting peak, and (ii) further having a shoulder in a region not less than 100° C. and not more than the low-temperature side melting peak temperature, the shoulder having a heat quantity (Qs) which is not less than 0.2% and not more than 3% of a low-temperature side melting peak heat quantity (Ql), and the polyethylene resin expanded particle having an expansion ratio of not less than 10 times and not more than 50 times.

13. The polyethylene resin expanded particle production method as set forth in claim 12, wherein the polyethylene resin expanded particle is in contact with water vapor having a pressure (gauge pressure) of not less than 0.045 MPa and not more than 0.15 MPa.

14. The polyethylene resin expanded particle production method as set forth in claim 12, wherein the polyethylene resin expanded particle is brought into contact with water vapor, so as to cause the polyethylene resin expanded particle to have a higher expansion ratio, the polyethylene resin expanded particle having been obtained by dispersing polyethylene resin particles together with carbon dioxide into an aqueous dispersion medium in a closed vessel, heating the polyethylene resin particles thus dispersed to a temperature not less than a softening temperature of the polyethylene resin particles and pressing the polyethylene resin particles thus heated, and thereafter discharging the polyethylene resin particles into a region having a pressure lower than an internal pressure of the closed vessel.

* * * * *